United States Patent
Joffray et al.

(10) Patent No.: US 11,209,956 B2
(45) Date of Patent: Dec. 28, 2021

(54) COLLABORATIVE MEDIA SHARING

(71) Applicant: Microsoft Technology Licensing, LLC, Redmond, WA (US)

(72) Inventors: Flynn Joffray, Vashon, WA (US); Sameer Halai, Seattle, WA (US); Stephen Coy, Redmond, WA (US); Steve Ickman, Redmond, WA (US); Todd Newman, Mercer Island, WA (US); William Portnoy, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 582 days.

(21) Appl. No.: 14/973,730

(22) Filed: Dec. 18, 2015

(65) Prior Publication Data

US 2016/0103572 A1    Apr. 14, 2016

Related U.S. Application Data

(63) Continuation of application No. 13/325,873, filed on Dec. 14, 2011, now Pat. No. 9,245,020.

(51) Int. Cl.
*G06F 3/0482* (2013.01)
*H04L 29/06* (2006.01)
(Continued)

(52) U.S. Cl.
CPC .......... *G06F 3/0482* (2013.01); *G06F 3/0487* (2013.01); *G06F 3/165* (2013.01);
(Continued)

(58) Field of Classification Search
CPC ...... G06F 3/0482; G06F 3/0487; G06F 16/78; G06F 16/735; G06F 3/165; G06F 3/048;
(Continued)

(56) References Cited

U.S. PATENT DOCUMENTS

| | | | | |
|---|---|---|---|---|
| 5,572,442 A | * | 11/1996 | Schulhof | H04H 20/40 348/E7.071 |
| 5,717,869 A | * | 2/1998 | Moran | G06Q 10/10 707/999.002 |

(Continued)

FOREIGN PATENT DOCUMENTS

| CA | 2646125 C | * | 10/2013 | ............... G09B 5/06 |
|---|---|---|---|---|
| WO | WO-2005013617 A1 | * | 2/2005 | ......... H04N 21/4786 |

OTHER PUBLICATIONS

David A. Shamma, Marcello Bastéa-Forte, Niels Joubert, Yiming Liu, Enhancing Online Personal Connections through the Synchronized Sharing of Online Video, Apr. 5-10, 2008, 6 pages (Year: 2008).*

(Continued)

*Primary Examiner* — Yongjia Pan
(74) *Attorney, Agent, or Firm* — Rainier Patents, P.S.

(57) ABSTRACT

A media party network service manages a set of media parties and a set of users of the media party service. Managing the media parties can involve instantiating new media parties according to input from the users, allowing the users to join the media parties, and tracking which users are participating in which media parties. Managing a given one of the media parties may include maintaining a queue of media items, allowing users in the media party to provide input to add media items to the queue and to provide input to skip media items in the queue. The media party service streams the given one of the media parties to client devices of the users currently in the given media party such that all of the client devices are currently displaying substantially a same part of a media item in the corresponding queue.

20 Claims, 10 Drawing Sheets

(51) Int. Cl.
*G06F 16/78* (2019.01)
*G06F 16/735* (2019.01)
*H04N 21/4788* (2011.01)
*H04N 21/482* (2011.01)
*H04N 21/6587* (2011.01)
*H04N 21/43* (2011.01)
*G06F 3/0487* (2013.01)
*G06F 3/16* (2006.01)
*G06F 3/0481* (2013.01)
*H04N 21/2387* (2011.01)
*G06F 3/048* (2013.01)

(52) U.S. Cl.
CPC ............ *G06F 16/735* (2019.01); *G06F 16/78* (2019.01); *H04L 29/06* (2013.01); *H04N 21/4307* (2013.01); *H04N 21/4788* (2013.01); *H04N 21/482* (2013.01); *H04N 21/4825* (2013.01); *H04N 21/6587* (2013.01); *G06F 3/048* (2013.01); *G06F 3/04817* (2013.01); *H04N 21/2387* (2013.01)

(58) Field of Classification Search
CPC . G06F 3/04817; H04L 29/06; H04N 21/4307; H04N 21/482; H04N 21/4825; H04N 21/6587; H04N 21/4788; H04N 21/2387
See application file for complete search history.

(56) References Cited

U.S. PATENT DOCUMENTS

| | | | | |
|---|---|---|---|---|
| 5,808,662 A * | 9/1998 | Kinney | ............... | G11B 27/002 348/14.1 |
| 6,484,156 B1 | 11/2002 | Gupta et al. | | |
| 6,941,324 B2 | 9/2005 | Plastina et al. | | |
| 7,047,030 B2 * | 5/2006 | Forsyth | ............... | H04L 12/1822 455/416 |
| 7,111,009 B1 | 9/2006 | Gupta et al. | | |
| 7,234,117 B2 | 6/2007 | Zaner et al. | | |
| 7,313,595 B2 * | 12/2007 | Rust | ............... | G06F 17/30861 707/E17.107 |
| 7,386,798 B1 | 6/2008 | Heikes et al. | | |
| 7,409,639 B2 | 8/2008 | Dempski et al. | | |
| 7,426,537 B2 | 9/2008 | Lee et al. | | |
| 7,571,212 B2 * | 8/2009 | Reynolds | ............... | G06Q 10/10 709/206 |
| 7,613,773 B2 * | 11/2009 | Watt | ............... | H04L 65/403 709/205 |
| 7,631,015 B2 | 12/2009 | Gupta et al. | | |
| 7,669,219 B2 * | 2/2010 | Scott, III | ............... | H04N 5/76 725/89 |
| 7,685,132 B2 | 3/2010 | Hyman | | |
| 7,702,728 B2 * | 4/2010 | Zaner | ............... | H04L 29/06 709/205 |
| 7,716,376 B1 | 5/2010 | Price et al. | | |
| 7,739,584 B2 * | 6/2010 | Vella | ............... | H04N 5/445 715/200 |
| 7,818,350 B2 * | 10/2010 | New | ............... | G06F 17/30766 707/803 |
| 7,822,687 B2 * | 10/2010 | Brilion | ............... | G06Q 30/0603 369/30.06 |
| 7,840,292 B2 | 11/2010 | Buil et al. | | |
| 7,908,321 B1 * | 3/2011 | Rust | ............... | G06F 17/30873 709/204 |
| 7,945,622 B1 * | 5/2011 | Pegg | ............... | G06Q 10/10 709/204 |
| 7,996,566 B1 * | 8/2011 | Sylvain | ............... | H04N 7/15 709/248 |
| 8,006,274 B2 * | 8/2011 | Scott, III | ............... | H04N 5/76 725/102 |
| 8,200,681 B2 | 6/2012 | Hedge et al. | | |
| 8,234,395 B2 * | 7/2012 | Millington | ............... | H04W 84/20 709/231 |
| 8,275,816 B1 * | 9/2012 | Pegg | ............... | G11B 27/105 707/829 |
| 8,327,266 B2 | 12/2012 | Svendsen | | |
| 8,444,490 B2 * | 5/2013 | Youm | ............... | A63F 13/795 463/4 |
| 8,539,106 B2 * | 9/2013 | Shah | ............... | G06F 17/30026 700/94 |
| 8,554,868 B2 * | 10/2013 | Skyrm | ............... | H04L 65/601 345/544 |
| 8,555,177 B1 | 10/2013 | Junee et al. | | |
| 8,655,953 B2 | 2/2014 | Kandekar et al. | | |
| 8,732,193 B2 | 5/2014 | Skeen et al. | | |
| 8,756,333 B2 * | 6/2014 | Jannink | ............... | G06F 17/30017 709/203 |
| 8,762,465 B2 * | 6/2014 | Kim | ............... | H04N 5/76 709/204 |
| 8,769,028 B2 * | 7/2014 | Herold | ............... | G06Q 10/10 709/206 |
| 8,792,850 B2 * | 7/2014 | Qureshey | ............... | G06F 17/30749 455/3.02 |
| 8,812,580 B2 | 8/2014 | Hyman | | |
| 8,971,541 B2 * | 3/2015 | Marko | ............... | H04R 20/40 381/1 |
| 8,973,063 B2 * | 3/2015 | Spilo | ............... | H04N 21/8455 725/78 |
| 8,990,317 B2 * | 3/2015 | Buyukkoc | ............... | H04N 21/25808 709/206 |
| 9,021,370 B1 * | 4/2015 | Carlson | ............... | G06Q 30/0607 715/751 |
| 9,218,017 B2 * | 12/2015 | Millington | ............... | G06F 16/68 |
| 9,245,020 B2 * | 1/2016 | Joffray | ............... | H04N 21/4788 |
| 9,423,945 B2 * | 8/2016 | Mattingly | ............... | G06Q 10/10 |
| 10,375,429 B1 * | 8/2019 | Greenfield | ............... | H04N 21/47202 |
| 2002/0085030 A1 | 7/2002 | Ghani | | |
| 2003/0002849 A1 * | 1/2003 | Lord | ............... | H04N 5/76 386/201 |
| 2003/0088875 A1 * | 5/2003 | Gay | ............... | H04N 7/17318 725/88 |
| 2003/0126211 A1 | 7/2003 | Anttila et al. | | |
| 2003/0225834 A1 * | 12/2003 | Lee | ............... | G06Q 10/107 709/204 |
| 2004/0254659 A1 | 12/2004 | Bolas et al. | | |
| 2005/0172001 A1 * | 8/2005 | Zaner | ............... | H04L 29/06 709/205 |
| 2005/0216549 A1 * | 9/2005 | Amano | ............... | G06Q 10/109 709/202 |
| 2005/0286546 A1 * | 12/2005 | Bassoli | ............... | G11B 27/002 370/432 |
| 2006/0002681 A1 * | 1/2006 | Spilo | ............... | H04N 21/4307 386/220 |
| 2006/0041617 A1 * | 2/2006 | Ludwig | ............... | G06Q 10/10 709/204 |
| 2006/0087987 A1 | 4/2006 | Witt et al. | | |
| 2006/0143236 A1 | 6/2006 | Wu | | |
| 2006/0167662 A1 * | 7/2006 | Yu | ............... | G06Q 10/10 702/186 |
| 2006/0195521 A1 * | 8/2006 | New | ............... | G06F 17/30766 709/204 |
| 2006/0236352 A1 * | 10/2006 | Scott, III | ............... | H04N 5/76 725/89 |
| 2007/0169165 A1 | 7/2007 | Crull et al. | | |
| 2007/0266304 A1 * | 11/2007 | Fletcher | ............... | G06F 17/241 715/230 |
| 2007/0271338 A1 * | 11/2007 | Anschutz | ............... | H04L 67/148 709/204 |
| 2008/0004734 A1 | 1/2008 | Li et al. | | |
| 2008/0028323 A1 | 1/2008 | Rosen et al. | | |
| 2008/0183811 A1 | 7/2008 | Kotras et al. | | |
| 2008/0195239 A1 * | 8/2008 | Rotholtz | ............... | G06F 17/30749 700/94 |
| 2008/0319856 A1 * | 12/2008 | Zito | ............... | G06F 17/30873 705/14.73 |
| 2009/0019553 A1 | 1/2009 | Narayanaswami | | |
| 2009/0044216 A1 | 2/2009 | McNicoll | | |
| 2009/0063991 A1 | 3/2009 | Baron et al. | | |
| 2009/0100062 A1 | 4/2009 | Fisher et al. | | |

(56) References Cited

U.S. PATENT DOCUMENTS

| | | | |
|---|---|---|---|
| 2009/0106357 A1* | 4/2009 | Igelman | H04L 65/608 709/203 |
| 2009/0112985 A1* | 4/2009 | Quinn | G06Q 10/00 709/204 |
| 2009/0182891 A1 | 7/2009 | Jalili et al. | |
| 2009/0217329 A1* | 8/2009 | Riedl | H04N 21/26258 725/93 |
| 2009/0228919 A1 | 9/2009 | Zott et al. | |
| 2009/0249222 A1* | 10/2009 | Schmidt | H04N 21/2368 715/751 |
| 2009/0249223 A1* | 10/2009 | Barsook | H04N 7/15 715/753 |
| 2009/0276709 A1 | 11/2009 | Venneman et al. | |
| 2009/0327282 A1 | 12/2009 | Wittig et al. | |
| 2009/0328122 A1 | 12/2009 | Amento et al. | |
| 2010/0017474 A1* | 1/2010 | Kandekar | H04N 21/4751 709/205 |
| 2010/0028740 A1 | 2/2010 | Kume et al. | |
| 2010/0070878 A1 | 3/2010 | Amento et al. | |
| 2010/0083324 A1 | 4/2010 | Smith et al. | |
| 2010/0153577 A1* | 6/2010 | Wohlert | H04L 67/303 709/231 |
| 2010/0228740 A1* | 9/2010 | Cannistraro | G06F 17/30749 707/748 |
| 2010/0306655 A1* | 12/2010 | Mattingly | G06F 3/0482 715/720 |
| 2011/0015970 A1* | 1/2011 | Medved | G06Q 10/00 705/12 |
| 2011/0113372 A1* | 5/2011 | Bennetts | G06F 1/3203 715/810 |
| 2011/0218656 A1 | 9/2011 | Bishop et al. | |
| 2011/0258545 A1 | 10/2011 | Hunter | |
| 2011/0268418 A1* | 11/2011 | Jones | H04L 12/1831 386/200 |
| 2011/0314388 A1 | 12/2011 | Wheatley | |
| 2012/0015613 A1* | 1/2012 | Zelson | H04W 4/21 455/90.1 |
| 2012/0036423 A1 | 2/2012 | Haynes, II et al. | |
| 2012/0117488 A1* | 5/2012 | Amidon | H04N 21/4532 715/753 |
| 2012/0216296 A1* | 8/2012 | Kidron | G06F 17/30867 726/28 |
| 2012/0271882 A1* | 10/2012 | Sachdeva | H04N 21/26258 709/204 |
| 2012/0290605 A1 | 11/2012 | Ickman et al. | |
| 2013/0005465 A1* | 1/2013 | Murphy | A63F 13/798 463/35 |
| 2013/0018960 A1* | 1/2013 | Knysz | H04L 65/403 709/204 |
| 2013/0041954 A1* | 2/2013 | Kim | H04L 65/1069 709/204 |
| 2013/0110921 A1* | 5/2013 | Logan | G06F 17/30053 709/204 |
| 2013/0254663 A1 | 9/2013 | Bates et al. | |
| 2014/0019882 A1* | 1/2014 | Chew | G06Q 10/10 715/753 |
| 2014/0029919 A1* | 1/2014 | Codavalli | H04N 7/155 386/278 |
| 2014/0033073 A1 | 1/2014 | Pegg | |
| 2014/0297729 A1* | 10/2014 | Wormington | G06F 16/68 709/203 |
| 2015/0033153 A1* | 1/2015 | Knysz | G06Q 50/01 715/753 |
| 2016/0234274 A1* | 8/2016 | Kretz | G11B 27/11 |
| 2016/0247535 A1* | 8/2016 | Latulipe | G11B 27/002 |

OTHER PUBLICATIONS

Jay Greene, YouTube gets Google+ viewing party feature, Aug. 18, 2011, 2 pages (Year: 2011).*

"Are Live Video Parties The Next Big Thing In Social Video?", Retrieved From <<http://socialtimes.com/live-video-parties_b75649>>, Retrieved Date: Oct. 21, 2011, 3 Pages.

"Box's Soup", Retrieved From <<http://box.soup.io/tag/contributor>>, Retrieved Date: Oct. 21, 2011, 214 Pages.

"Tired of Watching Videos Alone? Here Are the Best 3 Ways to Watch You Tube with Friends", Retrieved From <<http://www.makeuseof.com/tag/tired-watching-videos-3-ways-watch-youtube-friends/>>, Jul. 4, 2011, 6 Pages.

"What is muvee Cloud all about?", Retrieved From <<http://cloud.muvee.com/learnmore>>, Retrieved Date: Oct. 21, 2011, 1 Page.

"Final Rejection Received for U.S. Appl. No. 13/325,873", dated Dec. 17, 2014, 20 Pages.

"Non-Final Rejection Received for U.S. Appl. No. 13/325,873", dated Aug. 15, 2014, 17 Pages.

"Non-Final Rejection Received for U.S. Appl. No. 13/325,873", dated May 7, 2015, 22 Pages.

"Notice of Allowance Received for U.S. Appl. No. 13/325,873", dated Sep. 23, 2015, 7 Pages.

Stravarius, Justin, "7 Fun Facebook Video Conferencing and Chat Apps", Retrieved From <<http://web.appstorm.net/roundups/communication-roundups/7-fun-facebook-video-conferencing-and-chat-apps/>>, Sep. 5, 2010, 15 Pages.

* cited by examiner

COLLABORATIVE MEDIA SHARING

RELATED APPLICATION

This application is a Continuation of prior application Ser. No. 13/325,873, filed Dec. 14, 2011, entitled "COLLABORATIVE MEDIA SHARING", which is now allowed. The aforementioned application is hereby incorporated herein by reference in its originally filed form.

BACKGROUND

The proliferation of media sharing services on the Internet demonstrates the appeal of sharing media, in particular video media. A common approach is to allow users to post videos to a sharing service and then allowing other users to play the posted videos. With this approach, videos are viewed asynchronously. That is, users view videos at a time of their choosing, and with full control of the viewing experience. Although two users may have an interest in a same video, their viewing experiences are generally independent. Another common approach is to allow one controlling user, for example a Vi or Di, to control a video feed, and a virtual audience of users may concurrently experience the same stream of media produced by the controlling user.

These approaches, and others, have failed to produce a collaborative media sharing experience where users with a common interest can collaboratively shape and control the same media that the users are or will be concurrently experiencing. Techniques related to collaborative media sharing are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

A media party network service manages a set of media parties and a set of users of the media party service. Managing the media parties can involve instantiating new media parties according to input from the users, allowing the users to join the media parties, and tracking which users are participating in which media parties. Managing a given one of the media parties may include maintaining a queue of media items, allowing users in the media party to provide input to add media items to the queue and to provide input to skip media items in the queue. The media party service streams the given one of the media parties to client devices of the users currently in the given media party such that all of the client devices are currently displaying substantially a same part of a media item in the corresponding queue.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Embodiments discussed below relate to collaborative media sharing. Discussion will begin with an overview of collaborative media parties, followed by a description of a technical operating environment. User interface features, and collaborative operations will then be described in detail.

Figure 1:
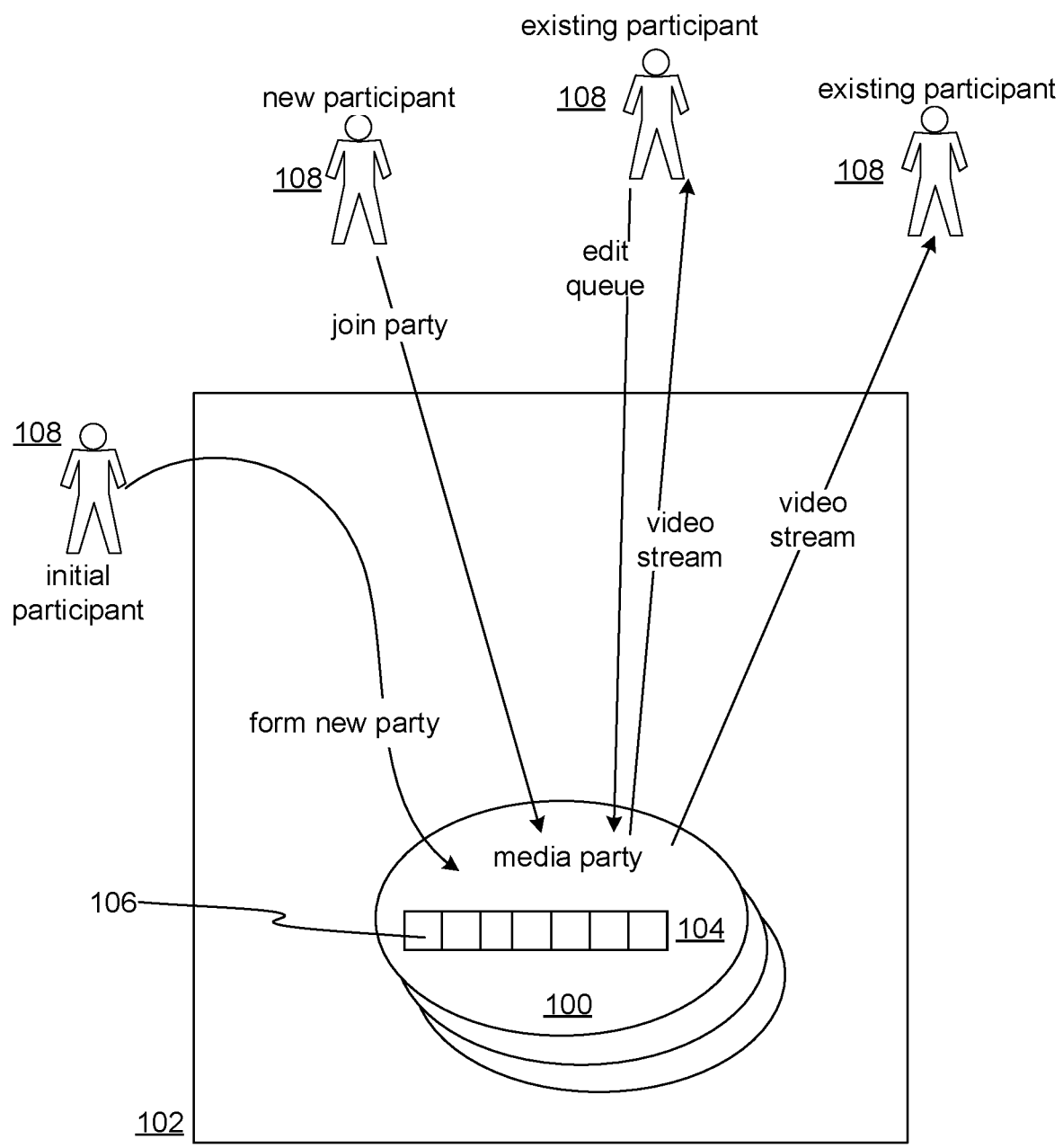
FIG. 1 shows an overview of a collaborative media party.

FIG. 1 shows an overview of a collaborative media party 100. A network service 102 maintains and manages media parties, including media party 100. Each media party has a media queue 104 comprised of individual media items 106. Each media party also has members or participants 108. The network service 100 can be implemented in a variety of ways, for example, as a network application hosted in a cloud, a multitier network service (see FIG. 2), a part of a search engine, as a component of a social networking website, etc. The participants 108 use respective client devices (e.g., mobile phones, laptops, workstations) that communicate with the network service 102 via a network. According to user inputs from the client devices, the network service 102 forms new media parties, adds and removes participants to and from parties, maintains and updates the media queues of the respective media parties, streams the media in the queues to the participants of the corresponding media parties, etc. As used herein, "media" will refer to at least video and audio, whether rendered from a video or audio data (e.g., clips and songs) or whether computer-generated (e.g., 3D animation).

Figure 2:
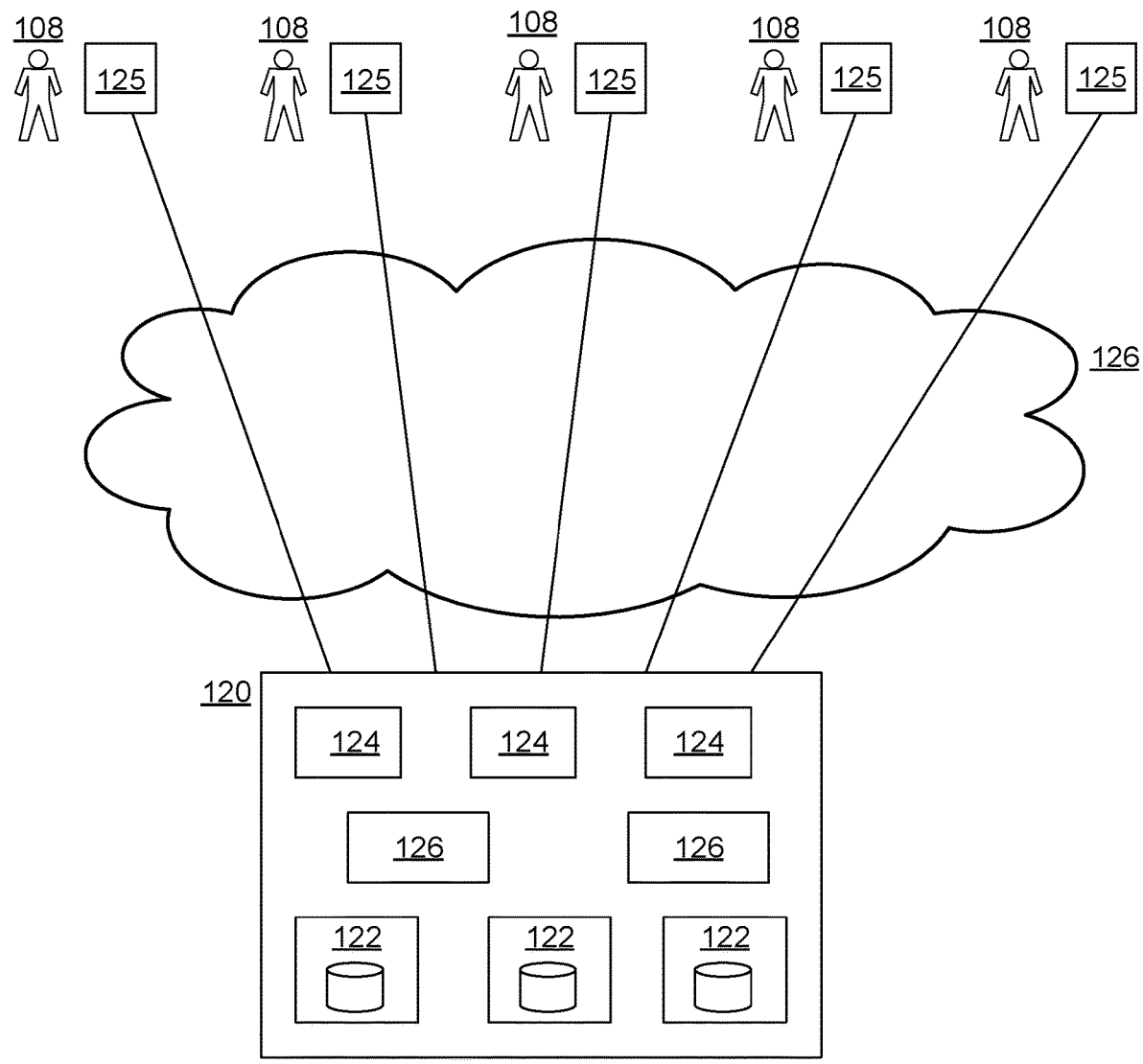
FIG. 2 shows a three-tier system having a data tier, a logic or control tier, and a presentation tier.

FIG. 2 shows a three-tier system 120 having a data tier, a logic or control tier, and a presentation tier. The three-tier system 120 is an example implementation of network service 102. The data tier may include one or more database servers 122, object stores, or the like. The data tier stores instances of media parties and data for each media party instance, such as metadata and state information (e.g., who is currently viewing the party, the current media and point therein that is being streamed/played), who is subscribed, who started the party, the party's queue content, historical data (past events of a party), media items in the queue, collaborative input related to the queue (e.g., vote counts for media items in the queue etc.) The presentation tier may be comprised of web servers 124. The client devices 125 connect access the system 120 by connecting to the web servers 124 through a network 126. The presentation tier may send program code, markup pages, scripting code, etc. to the client devices 125, to be displayed as respective user interfaces (see FIG. 4) for participating in media parties. Such user interfaces may allow users to form new parties, join parties, play the media content coming from a media party, alter the content of a media party, etc. Control tier 126 is comprised of servers 126 that host programs that implement logic of the media party system, model the media parties as objects, intermediate exchanges between the presentation tier and the data tier, and possibly perform other functions such as load balancing, fail-over switching, etc.

Figure 3:
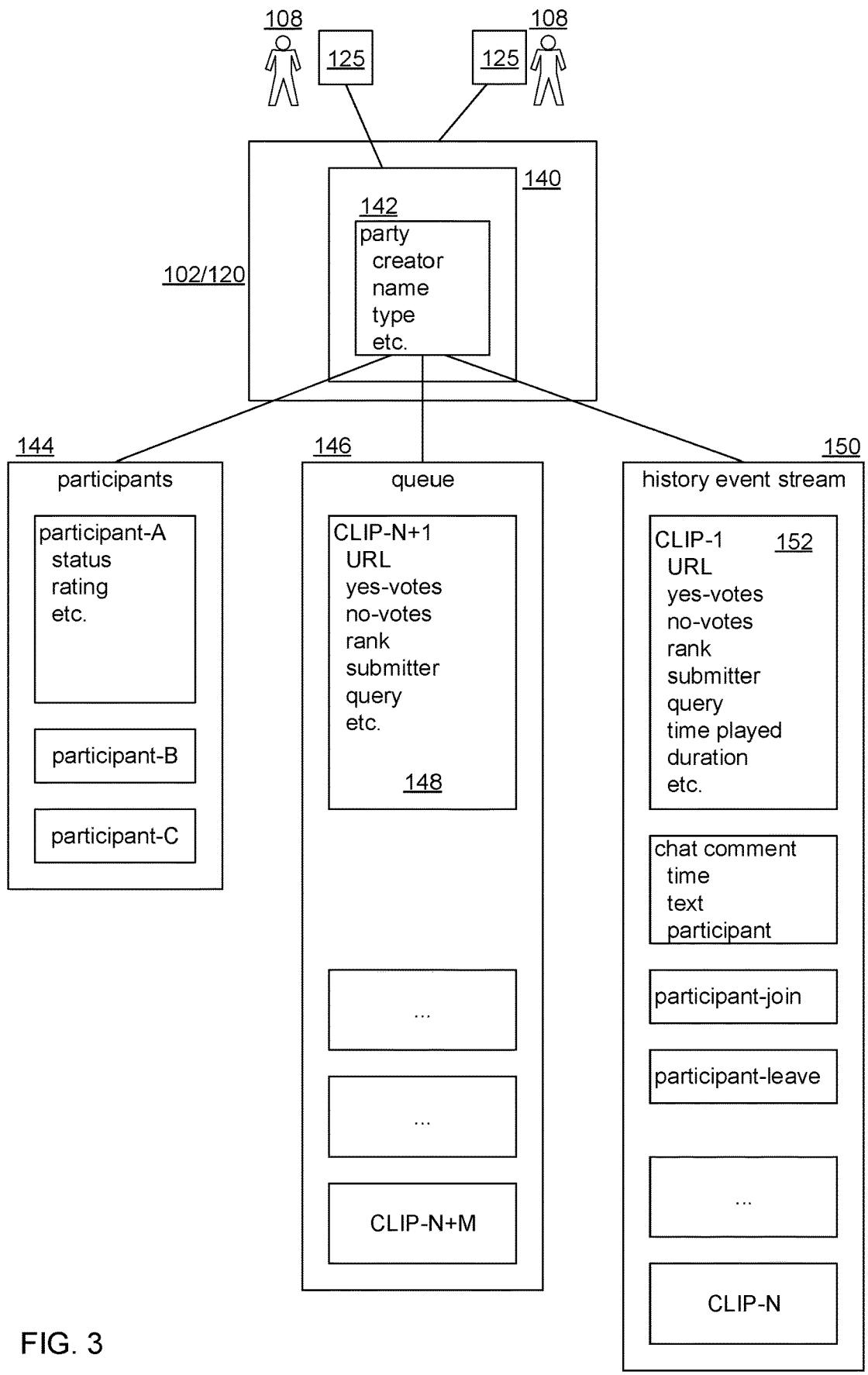
FIG. 3 shows an example of data stored for an example media party.

FIG. 3 shows an example of data stored for an example media party 140. The example of FIG. 3 is for illustration; the collaborative media sharing functionality described herein can be implemented with widely varying data structure and content. The media party 140 may have base metadata 142 storing properties of the media party such as the name of the party (e.g., "exploding batteries"), the identity of the user who created the media party 140, a type or category (e.g., open to public, invitation only), topical keywords, an associated search string or topic, and so on. The data of the media party 140 may also include participant data 144, indicating information such as who is a member of the media party 140, what is each member's or participant's status (currently listening/viewing, off-line), and other information.

The media party 140 data may also include queue data 146. The queue data 146 may have entries 148 representing media items queued for playing to current participants. Each entry 148 may have information about a media item, including a location or uniform resource locator of the media item, counts of votes for and against the media item, the identity of a user who submitted the media item to the media party 140, a query string or keywords associated with the media item, a rank or priority of the media items in the queue, and media data such as a title, duration, etc.

The media party 140 may also have history data 150. In one form, the history data 150 is a log or journal of timestamped events 152 associated with the media party 140. Such events 152 may indicate which media items were previously played by the media party 140 and when they were played, chat comments of participants listening to or viewing the media party 140, participants joining and leaving the media party 140, which participants voted for or against which media items (e.g., "Joe voted to skip the 'smoldering battery' clip"), and queue events such as media items being added, removed, reordered, completing or starting, and so on. These are illustrative examples that are neither required nor exhaustive.

Figure 4:
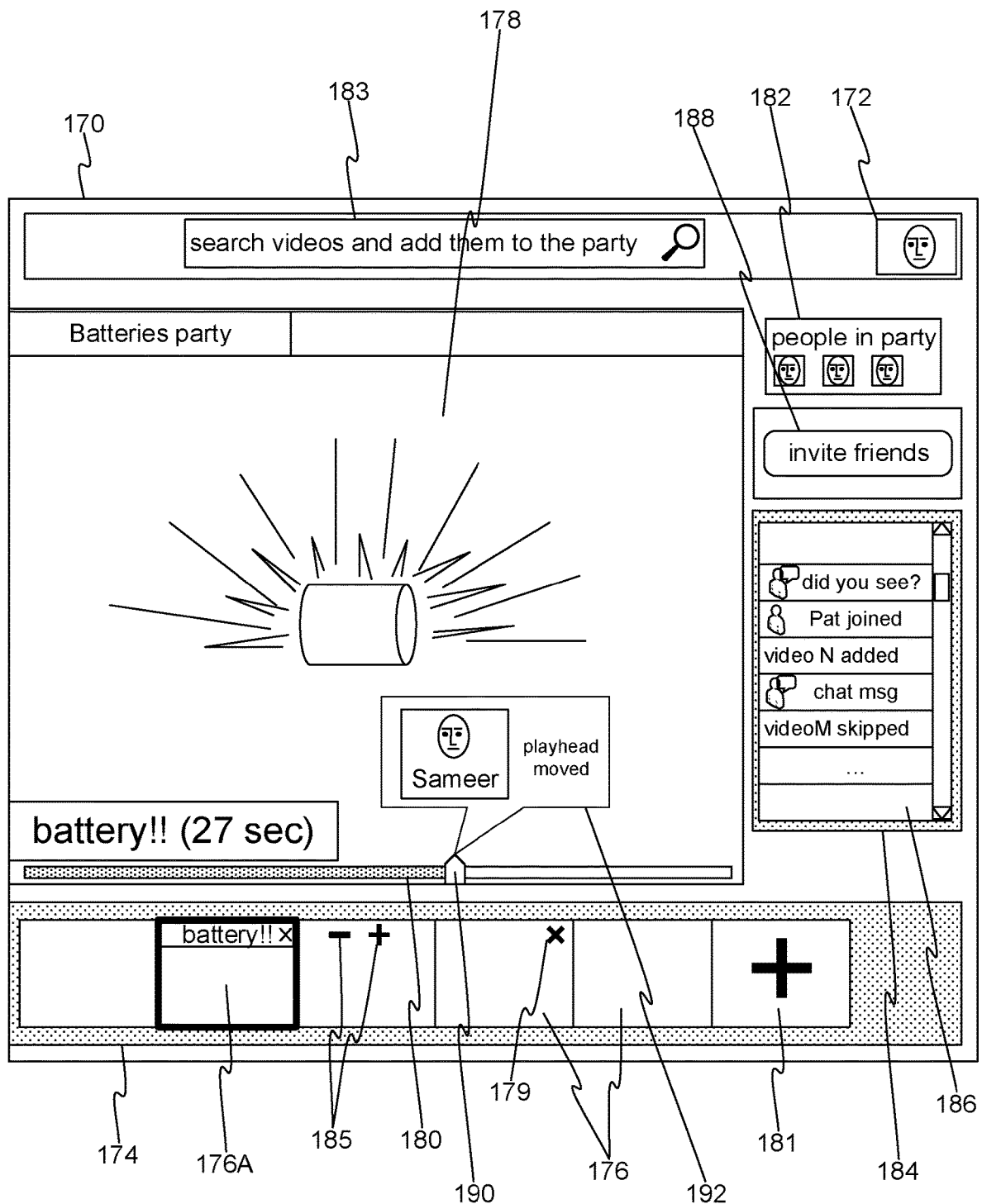
FIG. 4 shows a user interface displayed on a client device.

FIG. 4 shows a user interface 170 displayed on a client device 125. The user interface 170 may be displayed as a browser window or a standalone application displaying server data. The user interface 170 is for participating in a particular media party. In the example of FIG. 4, the media party is titled "Batteries party". The participant using the user interface 170 is depicted by icon 172. The user interface 170 also displays a graphic queue 174 representing the current media party's queue of media items. The graphic queue 174 displays media icons 176, including a current media icon 176A representing a media item currently being played to the participants of the media party.

A media display area 178 displays the media currently being played for the media party. The media display area 178 may include a progress indicator 180 indicating progress of the current media item. As discussed further below, each current participant in the media party has an instance of the user interface 170, with nearly the same appearance as user interface 170. In other words, each participant sees the current media queue and the current media being played for the media party.

The user interface 170 may include other elements such as a participant display area 182 displaying thumbnails or avatars of users currently in the media party. The user interface 170 may also include an information display area 184 to display information about events related to the media party as they occur. For example, the information display area 184 may display event indicators 186 to indicate: when users join or leave the media party, chat messages from participants, changes to the media queue, both for and against media items, and other information related to the media party. Events represented in the information display area 184 may be captured in a corresponding log such as history data log 150.

To facilitate collaborative media sharing, the user interface 170 and the party-implementing system in communication therewith enable collaborative participant control over the media being queued and played for a media party. With respect to the user interface 170, parts of the graphic queue 174 may be interactive. A media icon 176 may be provided with user interface elements such as vote buttons 185 to vote for or against a corresponding media item, or a button 179 to allow the user to remove the corresponding media item from the queue. In one embodiment, the graphic queue 174 may have an add button 181, that, when invoked, allows the user to specify a new media item to add to the media queue, possibly by putting input focus on a search element 183.

The search element 183 may be included to allow the user to input queries to search for media to add to the video party. When a search is entered, media items matching the search are displayed and the user can select a media item to add to the media queue. Finally, to further enhance collaboration, an invitation button 188 can be activated to invite other users to the current media party.

With regard to the collaborative control of the media, it should be noted that control of the content and ordering of the media queued for a media party can be open to more than one user. In one embodiment, any user is allowed to join any media party, and each member of a party has some control over the media party. Several techniques for facilitating control can be used. As mentioned above, votes can be collected from participants in a media party, and actions on the queue of the media party are taken according to the votes. Voting is described in detail with reference to FIG. 5. In one embodiment, any member of a media party can edit the party's media queue, for example, by skipping or deleting a media item, adding a media item, changing the order of items in the queue, etc. In this case, each time a participant changes the queue, other participants who are in the party see their graphic queues update accordingly. While unrestricted rights of participants can produce a rapidly changing and perhaps unique experience, voting can be helpful to prevent "rickrolling" and other disruptive actions.

Further regarding collaborative control of the media, one embodiment includes a scrubbing control 190. The scrubbing control 190 can be displayed on various of the instances of user interface 170. The scrubbing control 190 can indicate progression of the current media being played. In various embodiments, the scrubbing control 190 can also control the network service 120's playback of the current media item; any scrubbing by one participant is synchronized to the other participants so that each sees the scrub operation and the playback stays synchronized. In an embodiment where all participants have full control over media playback, any participant can manipulate their respective scrubbing control 190 to change the playback point of the current media item. Optionally, the user interface 170 of other users may display a graphic 192 indicating the user who is currently scrubbing the media item. In the example of FIG. 4, a remote user "Sameer" has moved his scrubbing control 190 to change the playback point. The graphic 192 can also provide information about the recent operation, such as "playhead moved", "restarted at 1:31", "skipped 4:20 forward", etc. In another embodiment, only privileged users or users who added the currently playing media item are permitted to scrub.

Figure 5:
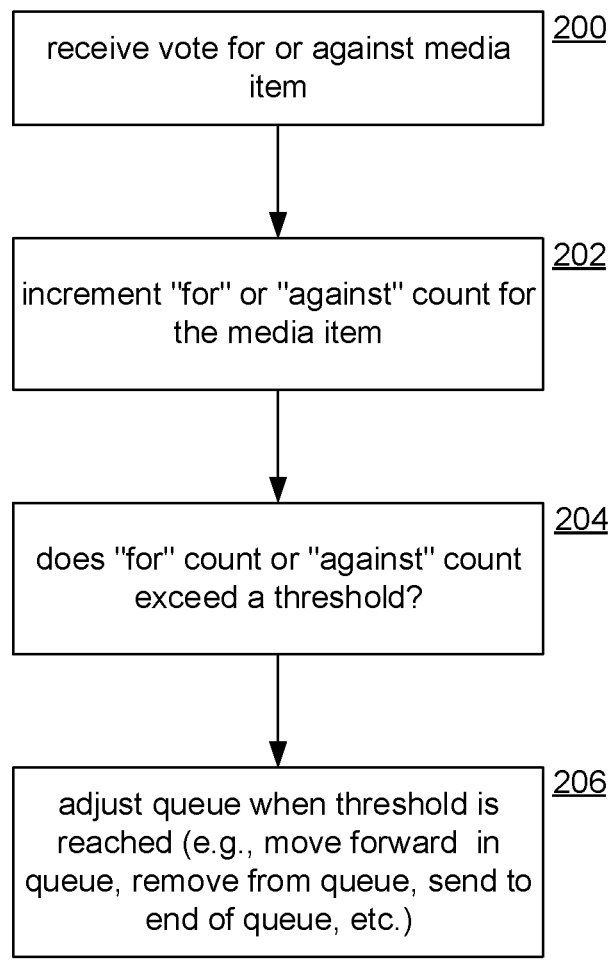
FIG. 5 shows a process for collaborative control by voting.

FIG. 5 shows a process for collaborative control by voting. At step 200, for a particular media party being managed, system 120 receives a vote for or against a media item. The vote might be for skipping or removing a media item, moving a media item to the front of the corresponding media queue, adding a new item, etc. At step 202, the incoming vote is added to a corresponding "for" or "against" count. At step 204, the updated voted count is compared against a threshold. At step 206, if the threshold is reached, then the queue is updated accordingly. By this means, participants can control the media party by voting. In one embodiment, media items can be queued and voted on while pending; when they are about to enter the head of the queue they are skipped or bumped to the back of the queue if they have not received sufficient votes.

Figure 6:
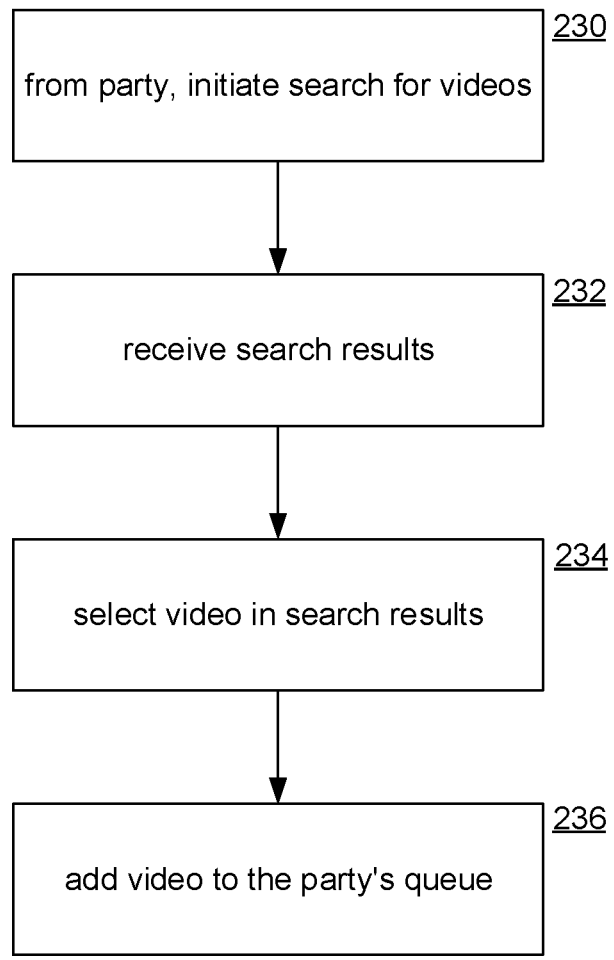
FIG. 6 shows a process for using a search to add media such as videos to a media party.

FIG. 6 shows a process for using a search to add media such as videos to a media party. At step 230, a participant in a given media party displayed in an instance of user interface 170 may initiate a new search for videos, for example, by inputting a query in search element 183. A search service handles the query and passes results (a list of matching videos) to the corresponding client, which receives the results at step 232. The results are displayed at step 234, and the user then selects a video which is added to the current party's queue at step 236. Open control of content and playing of the queue and can be turned on by setting vote thresholds to a value of one.

In one embodiment, the video party system is a web application that is an integral party of an open social search engine of the type described in U.S. patent application Ser. No. 13/105,914, filed May 12, 2011, and titled "SHARING PUBLIC SEARCH QUERIES AND INTERACTIONS". In this embodiment, not only is media searching readily available, but invitations can be obtained as part of the process of receiving a social stream in which the media party appears. For example, a social stream can be subscribed to by a user according to the social stream's relation to a particular topic or a particular user. A new media party can be advertised in such a stream. In addition, when a media item is added to a media party from search results supplied by an open social search engine, party-related interactions with that media item (e.g., addition to the party, votes, advancing or skipping, number of chat comments, etc.) can be used as search engine feedback. For instance, when a video is added to a media party of a particular topic, the video can be labeled as related to that topic and then used to help train statistical models or machine learning algorithms of the search engine. Generally, actions that indicate relevance of the video or media, such as "for" votes, increases in current participants when the video is played, etc., can indicate relevance. Other actions can indicate irrelevance, such as skipping a video or a drop-off in participation when the video is being played.

Figure 7:
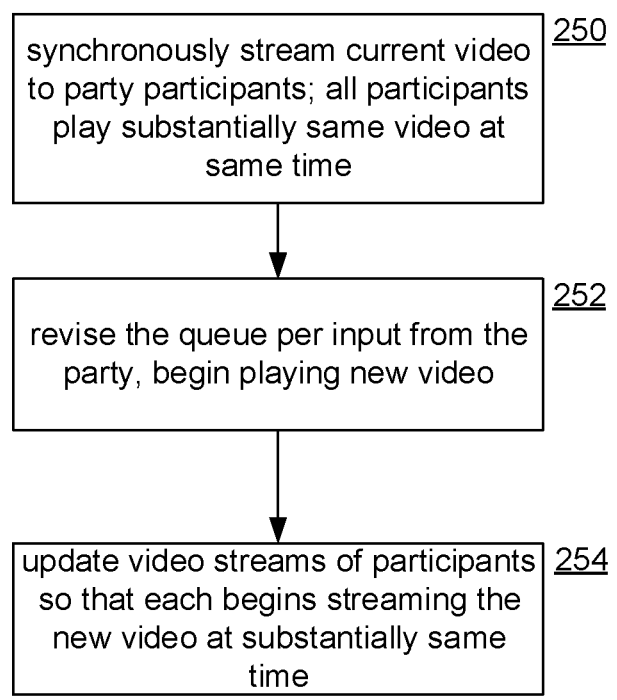
FIG. 7 shows a process for synchronizing video streams played to participants of a media party.

FIG. 7 shows a process for synchronizing video streams played to participants of a media party. At step 250 the media party system streams the current media item (a video) in the party's media queue to the participants of a media party. More specifically, each participant has a feed or stream, and the media party system synchronizes the streams or feeds of the participants such that each participant is playing substantially the same part of the same video at substantially the same time; "substantially" meaning that there is tolerance for some time separation, for example 5 or 10 seconds. At step 252, the queue is revised or updated according to input from the party participants, causing a new video or other type of media item to begin playing. At step 254 the video streams of the participants are updated such that each begins streaming the new video at substantially the same time. It will be appreciated that precise synchronization is not required; network latencies and other factors can skew the synchronization. Moreover, users can participate in a shared video watching experience with some tolerance for network latency and variation, and users can participate contemporaneously even while not being precisely synced. To ensure a continuity of the experience when stuttering occurs, the video bitrate can be lowered before lowering the audio bitrate to prevent discordant breaks in the sound. Generally, such technical adaptations can use heuristics or rules that reflect social conventions.

In addition to live participation, a video party can be experienced asynchronously. This can be enabled by tracking the history of video or media items played as well as comments, user-joins, and other events discussed above with reference to FIG. 3. In this way, when a user joins a video party, the user can experience past points of interest in the video party, in effect playing back the video party. Because comments are synced to the media timeline, replays of the media party allow the user to perceive the context in which replayed comments were made by other users. In addition, comments can comprise graphics that highlight or annotate particular regions of a video. A user playing back the history of a media party can join the live in-progress party at any point by activating a corresponding user interface element.

In one embodiment, a participant who is playing back the history of the media party is accelerated to catch-up to the present real-time media party. This can be accomplished with a number of known techniques for increasing the play speed of media in unobtrusive ways. For example, frames or chunks can be dropped during periods of somewhat constant video data, or play speed can be increased a small fraction above normal play speed. In yet another approach, a user settable play speed (e.g., "2×") can be set to catch up to the current play point of the video party. Subtle changes in playback speed or rate can be automatically adjusted by the media party application to help keep live participants continuously synchronized (e.g., within three seconds of each other). If one participant falls behind due to connectivity or performance problems, the participant's feed can be transparently accelerated to keep the participant synchronized.

Figure 8:
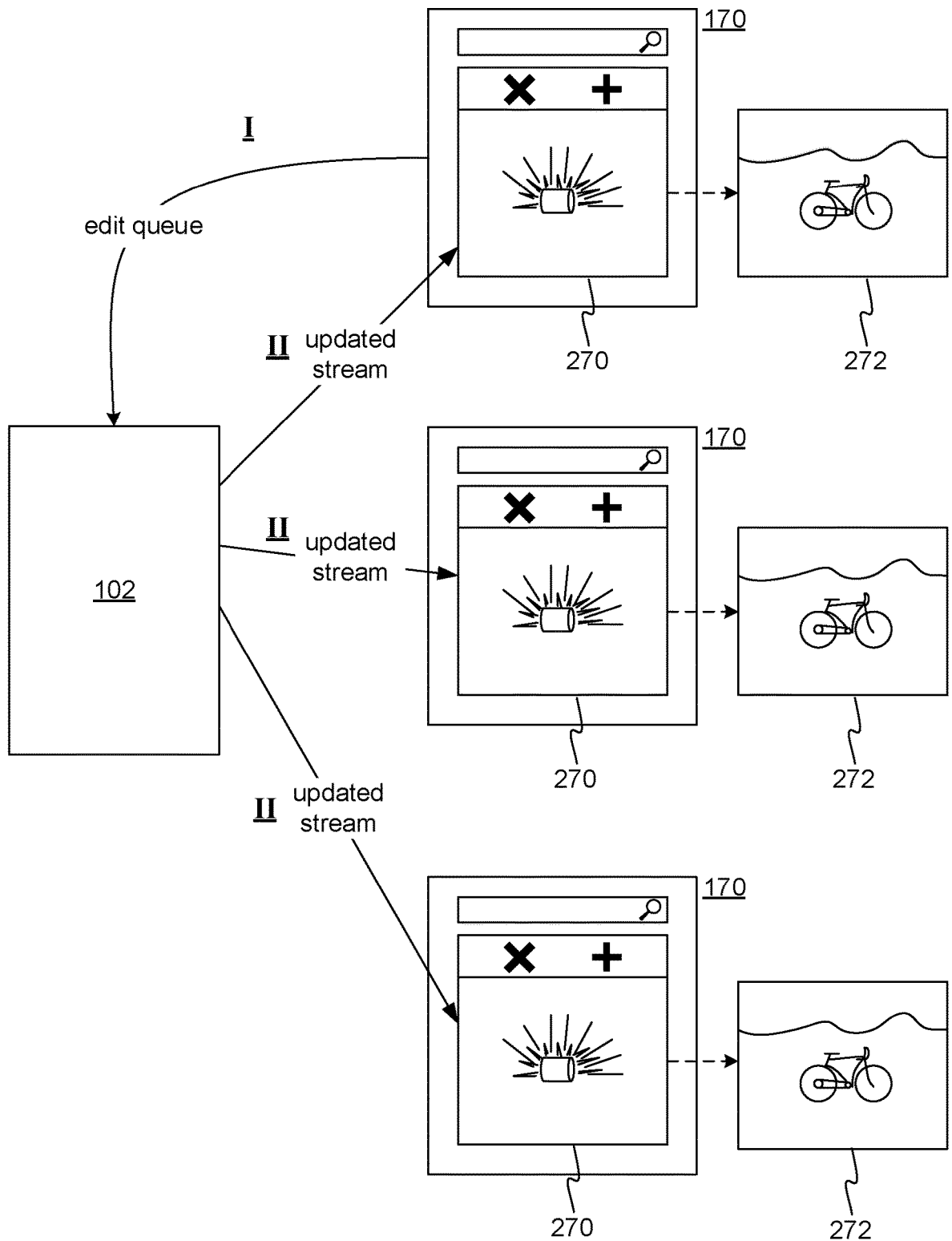
FIG. 8 illustrates how queue or streaming updates propagate to media party participants.
Figure 9:
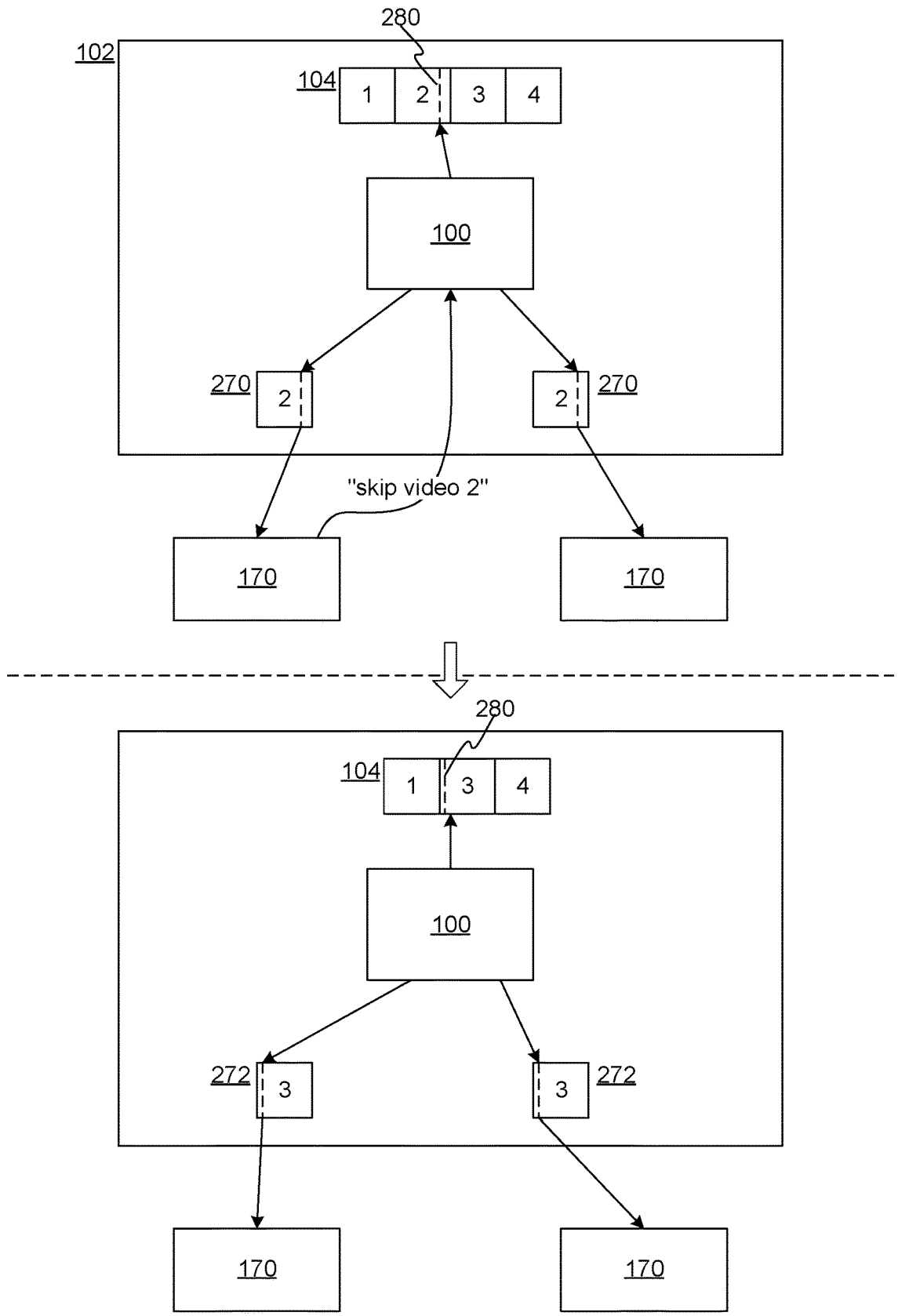
FIG. 9 shows media queue updates corresponding to FIG. 8.

FIG. 8 illustrates how queue or streaming updates propagate to media party participants. Initially, at timepoint I, each user interface 170 is displaying nearly the same portion of a video clip (an exploding battery is seen by each corresponding participant). At timepoint I, the media queue is edited (e.g., the current video is skipped) according to some individual or collective input. In response, a new video or new point of the same video is set as the current play-point for the media party. In turn, the media party system begins streaming the new current play-point to the respective client devices, which begin playing the same second video 272 of a bicycle on the respective user interfaces 170. Thus, in response to collaborative control, the video played for the participants synchronously updates from a first video 270 to a second video 272. FIG. 9 shows media queue updates corresponding to FIG. 8. Initially, in the upper half of FIG. 9, the media party network service 102 or web application is playing first video 270 at current point 280, which is streamed and synchronously displayed at the connected user interfaces 170. When the first video 270 is voted out of the media queue 104 (or removed by the person who added it), the media queue 104 is updated and, as shown in the lower half of FIG. 9, the second video 272 begins playing.

Figure 10:
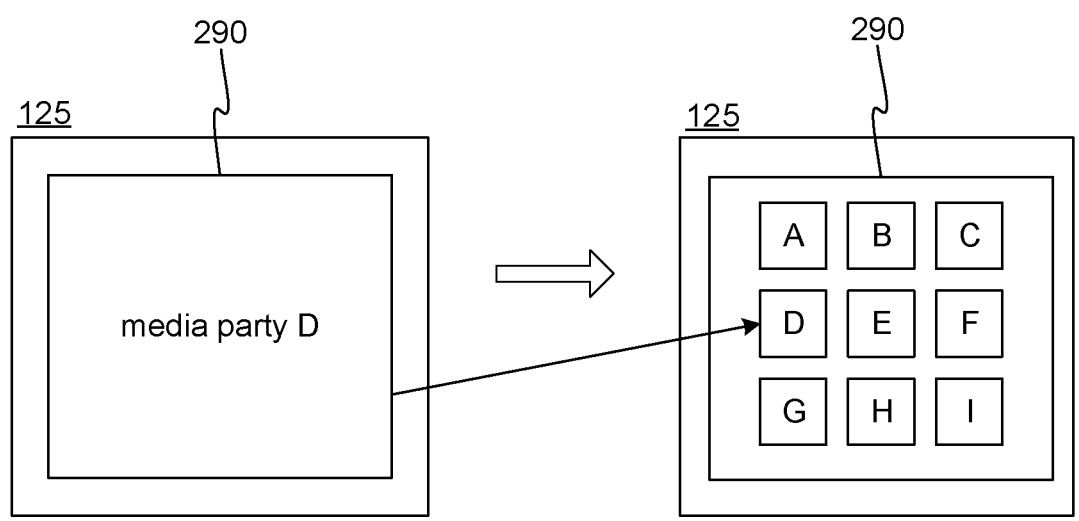
FIG. 10 shows a second user interface that can be provided to allow a user to participate in multiple media parties.

FIG. 10 shows a second user interface 290 that can be provided to allow a user to participate in multiple media parties. In this embodiment, a media party is a "sticky experience", in that leaving the main screen or user interface 170 of a given media party does not prevent the user from participating in the content viewing experience with the group of people on the main screen of the video party. In the example of FIG. 10, the second user interface shows reduced views of the various media parties that the corresponding user is subscribed to or participating in. The reduced views might show the current content and indicia of select events.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any current or future means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on.

The invention claimed is:

1. A method performed by one or more computers to implement a network service, the method comprising:
    serving, by the network service, a media party comprising a media item to a group of participant devices participating in the media party with instances of a user interface provided at least in part by the network service and displayed by the participant devices, each user interface comprising:
        a media display area that displays the media item as served by the network service; and
        a scrubbing tool comprising a slider and able to scrub the media item while the media item is being synchronously streamed to the participant devices;
    the serving the media party comprising:
        synchronously streaming the media item to the participant devices to be displayed in respective media display areas;
        receiving a scrubbing input generated by manipulation of a particular slider of a particular one of the scrubbing tools on a particular participant device; and
        signaling non-manipulated scrubbing tools to move their respective sliders in their respective user interfaces in accordance with the manipulation of the particular slider of the particular one of the scrubbing tools, the signaling including causing the non-manipulated scrubbing tools to display text in association with their sliders to indicate that a scrubbing event has occurred, wherein the text comprises an amount of time skipped by the scrubbing event and the respective sliders of the non-manipulated scrubbing tools comprise information graphics that convey an identity of a particular participant that initiated the scrubbing event on the particular participant device.

2. A method according to claim 1, wherein the media party comprises a media queue, and wherein the serving the media party further comprises receiving requests from the participant devices, the requests comprising requests to add individual media items to the media queue and requests to skip synchronously streaming media items in the media queue.

3. A method according to claim 2, wherein the user interface further comprises graphic representations of the individual media items in the media queue, the graphic representations comprising vote elements, wherein activation of a respective vote element generates a vote event associated with a respective media item of a corresponding graphic representation.

4. A method according to claim 1, wherein the serving the media party further comprises sending invitations to join the media party into a social media stream.

5. A method according to claim 1, wherein the serving the media party further comprises providing interactions of the participant devices with the media party, wherein a search algorithm of a search engine is updated accordingly.

6. A method according to claim 1, further comprising:
    restricting scrubbing of the media item to the particular participant based at least on the particular participant having added the media item to the media party.

7. A method according to claim 1, further comprising:
    restricting scrubbing of the media item to the particular participant based at least on the particular participant being designated as a privileged user.

8. A computing device comprising:
    a display;
    processing hardware; and
    storage hardware storing instructions, that when executed, cause the processing hardware to perform a process comprising:
        displaying a user interface comprising a media display area and a scrubbing slider;
        participating in a media party by receiving a media item synchronously streamed to the computing device and to other computing devices participating in the media party;
        displaying the synchronously streamed media item in the media display area; and
        responding to an indication of a scrubbing event initiated by a particular one of the other computing devices by:
            displaying a corresponding movement of the scrubbing slider, wherein responding to the indication of the scrubbing event further comprises displaying text in association with the scrubbing slider indicating that the scrubbing event has occurred, and wherein the text comprises an amount of time skipped by the scrubbing event; and
            displaying an information graphic on the scrubbing slider, wherein the information graphic conveys an identity of a particular participant in the media party that initiated the scrubbing event on the particular one of the other computing devices.

9. A computing device according to claim 8, wherein the information graphic includes a name of the of the particular participant that initiated the scrubbing event on the particular one of the other computing devices.

10. A computing device according to claim 9, the process further comprising:
    receiving a graphic comprising a highlight on a particular region of the media item, the graphic having been input by the particular participant in the media party that initiated the scrubbing event on the particular one of the other computing devices; and displaying the media item with the particular region of the media item having the highlight.

11. A computing device according to claim 8, the process further comprising:

receiving a graphic annotation inputted, by the particular participant, into a particular media display area of the particular one of the other computing devices while displaying the synchronously streamed media item; and based on receiving the graphic annotation, displaying the graphic annotation in the media display area while the media display area continues to display the synchronously streamed media item.

12. A computing device according to claim 8, wherein the displaying the user interface further comprises displaying graphic representations of respective users operating the other computing devices, respectively.

13. A computing device according to claim 12, wherein which graphic representations are displayed varies in accordance which of the other computing devices join and exit the media party during the synchronous streaming of the media item.

14. A computing device according to claim 8, wherein the text comprises a time in the synchronously streamed media item to which the scrubbing event skipped ahead in the synchronous streaming of the media item.

15. A computing device according to claim 8, wherein the text is displayed in a callout graphic that is graphically linked to the scrubbing slider.

16. A method performed by a computing device comprising a display, processing hardware, and storage hardware storing instructions, the method performed by the processing hardware executing the instructions, the method comprising:

joining, over a network, a media party, the media party comprising a media item synchronously streamed to participant devices participating in the media party;

displaying a user interface comprising a media display area and a scrubbing slider, the displaying including displaying the synchronously streamed media item in the media display area while the synchronously streamed media item is being displayed by the participant devices;

receiving, via the network, an indication of a scrubbing event initiated by a particular one of the participant devices displaying the synchronously streamed media item; and responsive to receiving the indication of the scrubbing event:

displaying a corresponding movement of the scrubbing slider and also displaying text indicating an amount of play time of the media item that was skipped by the scrubbing event; and displaying an information graphic on the scrubbing slider, wherein the information graphic conveys an identity of a particular participant in the media party that initiated the scrubbing event on the particular one of the participant devices.

17. A method according to claim 16, wherein the received indication includes information about the scrubbing event.

18. A method according to claim 17, wherein the indication comprises an identity of the particular participant that initiated the scrubbing event.

19. A method according to claim 16, wherein the indication comprises a skip-to time within a duration of the synchronously streamed media item or the amount of play time skipped by the scrubbing event.

20. A method according to claim 16, wherein the location of the text is determined according to the location of the scrubbing slider after the movement of the scrubbing slider.

* * * * *